United States Patent [19]

Bozzolato

[11] Patent Number: 4,644,661

[45] Date of Patent: Feb. 24, 1987

[54] SIGNAL FOR INDUSTRIAL SURVEYS

[75] Inventor: Giovanni Bozzolato, Segrate, Italy

[73] Assignee: AGIP, S.p.A., Milan, Italy

[21] Appl. No.: 828,441

[22] Filed: Feb. 11, 1986

[30] Foreign Application Priority Data

Apr. 19, 1985 [IT] Italy .............................. 20430 A/85

[51] Int. Cl.$^4$ ............................................. G01C 15/06
[52] U.S. Cl. ........................................................ 33/293
[58] Field of Search ........................................... 33/293

[56] References Cited

U.S. PATENT DOCUMENTS 2,538,475 1/1951 Skrastin .................................. 33/293

Primary Examiner—Harry N. Haroian
Attorney, Agent, or Firm—Hedman, Gibson Costigan & Hoare

[57] ABSTRACT

"Three-conical" signal for industrial surveys stituted by a vertical transparent cylinder, inside which two conical axial cavities are excavated, unsymmetrical, opposite to each other, and painted in luminescent orange color, whose vertices are connected by a vertical cylindrical bore; said vertical cylinder is supported by a base which supports in its turn within the lower conical cavity a parabolic reflector and a lamp, and is provided atop with a conical cap axially provided with a small transparent vertical cylinder, ending with a sharp conical top, and being provided in its lower portion with a surface having the shape of a spherical cap.

11 Claims, 2 Drawing Figures

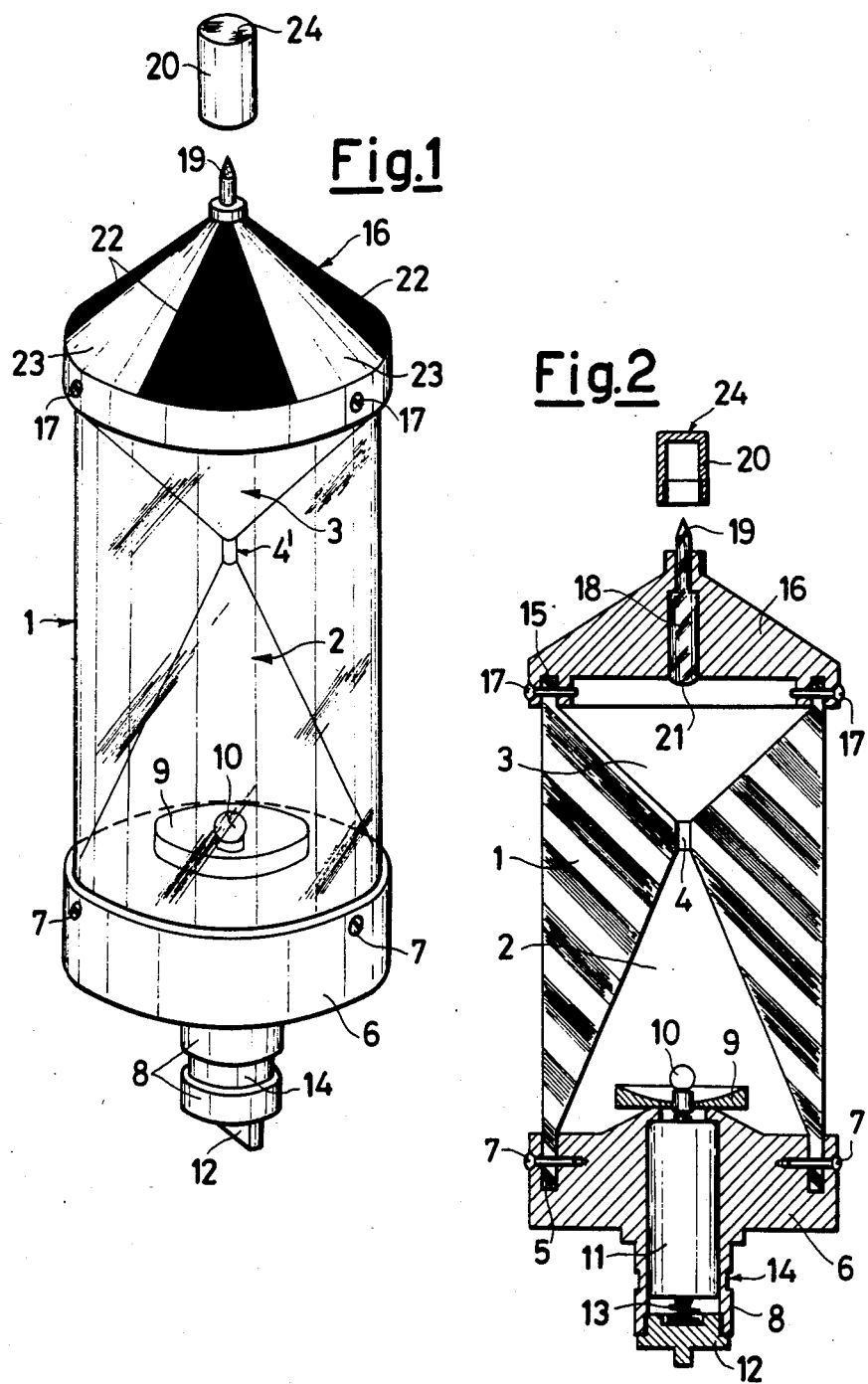

SIGNAL FOR INDUSTRIAL SURVEYS

The present invention relates to a novel signal which, by being of "space" type, and hence collimatable with high precision both in planimetry and in altimetry from any position, on a 360° horizon turn, without that it be needed it to be orientated, and by being easily visible also at night time, allows a more efficacious, precise and quick industrial survey, both daily and nightly, of large buildings and naval constructions.

As the signal being the object of the invention is substantially constituted by two coaxial cones opposite to each other in correspondence of their vertices, so as to form a sort of clepsydra, surmounted by a third cone, it too coaxial, said signal is denominated "three-conical".

The problem of adequately signalling points of a construction has nowadays assumed a considerable importance, due to the development of new survey techniques, such as the application of photogrammetric technologies, which have shown to be the most reliable and complete in dimensionally verifying a structure of large dimensions and however complex, as studies and practical experiences have widely confirmed.

Said photogrammetric methodologies imply indeed the a priori determination, by trigonometric way, and with the precision of ±1 mm, of planimetric and altimetric coordinates of a certain number of so-called "points of support", necessary to exactly reconstruct the scale and the position of the tridimensional optical model of the object photographed.

It is now evident that the precision in determining the coordinates of a point depends basically on the quality of the signal used to localize said point.

From the present art, different signal types are known, generally used in topographic surveys.

Said known signals range from the so-called "target", constituted by an array of concentric rings of alternate strongly contrasting colours, e.g., white-black, or white-red, which is an outstandingly visible signal, but which is not much useful to measurement purposes, to the signal constituted by a "check plate" fastened on to a post, which results however inadequate for precise measurements, in that it does not allow an optimum collimation with the telescope goniometer, to the said "check plate" signal, but modified in the sense that the check pattern is now turned by 45°, that gives rise to a signal allowing efficacious collimations in planimetry.

In the field of geodesy and topography signals are presently used, allowing fairly precise planoaltimetric collimations, said signals being substantially constituted by a metal rectangular plate with a pattern based on white isosceles triangles positioned horizontally and vertically, so as to form a white Maltese cross, sometimes with extended arm, onto which the black reference lines of goniometer's grid stand out well.

On the other hand, for a point to be precisely determined, collimating from a plurality of directions convergent towards each other, better if distributed on horizon's turn, is necessary.

To that purpose, the modern signals, which all are flat, are so mounted as to be rotatable around their own vertical axis, through a rotation axle housed inside a triangular base horizontally levellable by means of three screws, and fastened on a tripod or small pillar. In such a way, the flat signal can be easily orientated by an operator, so as to have each time its pattern always facing towards the goniometric station, from which the measurements are to be carried out at that time, that can be done quite easily in the field of topographic and geodetic surveys, in that in this field signals are collimated from distances usually not longer than 200 meters, and are hence easily reached by the operator or by his assistant who has to orientate them.

Said known signals are however absolutely unsuitable to the particular operative needs of dimensional survey of large structures, such as those to be met in the industrial field, and in particular in a yard wherein steel structural work is prepared for off-shore constructions.

In fact, if they would be positioned on tripod on ground, they, besides being not easily visible among the yard's stuff, would also hinder staff's working. One could also plan to operate out of working time, but then the incipient night and consequent lack of light would render collimation very difficult, thus impairing measurement precision.

If on the contrary the signals were positioned on a support fastened in an elevated spot, they would not disturb, and would be well visible from any sides, but it would be necessary that each time somebody may go to turn them towards the goniometer's station spot.

The said expedient of each time going to turn the signal towards the different station, thus rendering it a "space signal" collimatable from everywhere, is however burdensome and not accomplishable on such great distances as those now involved, in that, due to the size and overall dimensions of the structures to be dimensionally surveyed, as well as of interposed obstacles, the surveys must be necessarily carried out from considerable distances. Moreover, elevated positions are clearly above the structure, which is generally some tens of meters high, so it is each time necessary to clamber and come down along scaffoldings, or alternatively use a crane-lifted cage, with consequent considerable risks for the operator-topographer, who not always is familiar with yard environment.

Purpose of the present invention is precisely to obviate the above said drawbacks, and to provide hence a signal specific for industrial surveys which, besides considerably reducing the survey accomplishing times and consequently costs, avoids operators' risks as far as possible, by reducing the clamberings to the initial installation and to the end removal of same signal only.

That purpose is substantially achieved by providing a "space" signal, i.e., a signal having the same appearance from whichever direction it is looked at, without needing to be oriented.

Such a signal could be obtained by supposing to rotate the already mentioned modified flat "check plate" signal around it vertical axis, thus generating a clepsydra-shaped solid. However, the configuration of two conical solids coaxial and opposite to each other at their vertices (clepsydra) deriving from that has a weak point in correspondence of the point where the vertices join, i.e., the collimation point, that renders such a signal fragile or deformable, according to the material used to manufacture it.

The problem has been solved by excavating inside a transparent, vertical cylinder of glass, plexiglas, and so on, starting from the bases of the same cylinder, two conical cavities coaxial, unsymmetrical as for their heights, and opposite to each other by their vertices, and connecting these vertices, which are close to each other, by a vertical cylindrical bore which, by appearing as a small cylinder from the outside, is a collimation point, fulfilling the required conditions of highest stability and strength.

By that a clepsydra-shaped signal is obtained, whose visibility and collimatability is complete and precise over all 360° on horizon turn, whilst the asymmetry in height of the two conical cavities facilitates the visibility under the least comfortable collimation conditions from down upwards, as experimentals tests have demonstrated, allowing the one or the other of the two cones to be used according to the different cases, with a simple overturning of the same signal, which can be fixed in suspension.

The two conical cavities said are then interiorly painted with an orange colour luminescent at day time, and transparent at night time, to the purpose of favouring the finding and the precise measuring thereof. Such colouring renders indeed the signal better visible to photographic purposes, and easily findable in the yard, and is moreover very well visible in the photographs, hence serving very efficaciously in laboratory photogrammetric measurements.

On the other hand, such a "space" signal is very suitable for high-precision planimetric measurements at ±1 mm, but does not allow a similar precision in altimetry, due to the deviation of optical rays caused by the different refractive index of air and of the transparent material constituting the said vertical cylinder. In fact, whilst the optical rays directed perpendicularly to the cylinder's side surface are not deviated, any visual not perpendicular to said surface shall suffer a deviation as a function of the incidence angle and of the refractive index of more dense material.

It is hence essential to have also a collimation point external to the cylinder for height measurements, to be able to measure the height of a point with a precision comparable to planimetry's, i.e., of ±1 mm.

To that purpose, the vertical cylinder has been equipped atop with a conical cap, preferably of metal, axially provided with a small transparent cylinder of plexiglas or the like, having in its lower part a lens-acting surface with spherical cap shape, and ending, outside the vertix of said metal cone, with a sharp-pointed conical top, constituting the collimation point for high-precision measurements in altimetry.

The so-obtained "three-conical" signal guarantees now a precise planimetric and altimetric collimation at ±1 mm both in yard (microgeodesy) and in laboratory (photogrammetry).

To be able then to carry out also nightly measurements, when yard is closed and the measurements result hence better, an inner lighting of the signal is additionally provided. To that purpose, the said vertical cylinder is supported onto a cylindrical base, preferably of metal, supporting in its turn, inside the said lower conical cavity, a parabolic reflector and a lamp energized by a battery housed inside the base cylindrical pin the base is provided with, said pin being suitable to be inserted inside the standard triangular base of topographic signals.

One single lamp is able to efficaciously light the whole signal, with treble effect. In fact, when such lamp is turned on, a portion of the light shines through the lower conical cavity, and illuminates, by reflection, the upper conical cavity; another portion passes on the contrary vertically through the cylindrical bottleneck and is focused by the said spherical cap of the small transparent cylinder of said metal conical cap, to illuminate a point which is coincident with the vertix of said sharp conical end which hence lightens like a star.

Finally, the outer conical surface of said metal conical cap is provided coloured in alternating triangular sectors, white and black or of other highly contrasting colours, whilst the roof of protective cap of said sharp-pointed conical top, cap to be removed only during the high-precision measurements, is provided coloured in a showy way, in luminescent orange or yellow colour, so that both of them can be used as photogrammetric signal for daily photographs taken from up downwards, or nadiral photographs.

Summarizing, the signal for industrial surveys, to be installed in the points of which measuring the planimetric and altimetric coordinates by collimating the same signal from different positions on horizon turn by goniometer is desired, is characterized according to the present invention in that it is constituted by a transparent vertical cylinder wherein, starting from the bases, two cavities have been excavated coaxial, conical and opposite to each other, whose vertices, close to each other, are connected by a vertical cylindrical bore constituting the collimation point for the determination of planimetric coordinates, said cylinder being supported by a cylindrical base provided with base cylindrical pin suitable to be inserted into the standard triangular base of topographic signals, and being provided atop with a conical cap axially equipped with a small transparent vertical cylinder which is provided in its lower part with a surface having a spherical cap shape, acting as a convergent lens and ends externally to the vertix of said conical cap with a conical sharp-pointed end constituting the collimation point for the determination of altimetric coordinates, means being moreover provided to internally illuminate said signal.

According to then another characteristic of the invention, the said means to internally illuminate the signal consist of a parabolic reflector and a lamp supported by said cylindrical base inside said lower conical cavity, said lamp being energized by a battery housed inside the first base cylindrical pin.

Another characteristic of the invention is given by the fact that the two coaxial and opposite to each other conical cavities are interiorly painted in orange colour, luminescent at day time and transparent at night time.

According to then a preferred embodiment of the invention, the said two coaxial and opposite to each other conical cavities as unsymmetrical as for height.

According to another preferred embodiment of the invention, the said transparent vertical cylinder, and/or said small transparent cylinder the said conical cap is equipped with, are made with a methyl metacrylate resin, commonly denominated plexiglas.

A further preferred embodiment of the invention is given by the fact that said cylindrical base and/or said conical cap are made of metal material.

Finally, further characteristics of the present invention are given by the fact that the said conical sharp-pointed end of said small transparent cylinder is protected by a removable protecting cap, whose roof is coloured with a luminescent colour, and by the fact that the outer conical surface of said conical cap is coloured in alternating triangular sectors white and black or of other highly contrasting colours.

The invention is now better clarified with reference to the attached drawing, illustrating a preferred practical embodiment given to exemplifying and not limitative purpose only, in that it shall be always possible to introduce technical or structural variants within the limits of the present invention.

In said drawing:

FIG. 1 shows a perspective view of the signal according to the invention;

FIG. 2 shows a sectional view taken along the middle plane of the signal of FIG. 1;

Referring to the figures, with 1 a transparent vertical cylinder of plexiglas, glass or other material is indicated, wherein, starting from the bases, the two conical cavities coaxial, unsymmetrical in height, and opposite to each other at their vertices, respectively 2 and 3, have been excavated. Said conical cavities 2 and 3 are interiorly painted with orange colour luminescent at day time, and transparent at night time, and are connected to each other in correspondence of their vertices by a vertical cylindrical bore 4 appearing from the outside as a small cylinder 4' (see FIG. 1) and constituting the collimation point for planimetric measurements.

The cylinder 1 is then inserted with its lower circular edge 5 into a corresponding circular hallow provided in a cylindrical base 6, preferably of metal, on to which it is supported by means of the threaded screws 7. Said base 6 is provided in its lower part with a base cylindrical pin 8 and supports on its upper end, and inside the lower conical cavity 2, a parabolic reflector 9 and a lamp 10 which is energized by a battery 11 housed inside said base pin 8. To that purpose, said base pin 8 is provided with a small threaded cap 12 provided with pressing spring 13. The base pin 8, besides being suitable to be inserted into the standard triangular base of topographic signals, is then also provided with an outer circular groove 14 to allow it to be fastened onto said base by cooperating with a stop screw of this latter.

The upper circular edge 15 of vertical cylinder 1 is on the contrary inserted into a corresponding circular cavity provided on a conical cap 16, preferably of metal, which is fastened onto said cylinder by means of threaded screws 17.

Said conical cap 16 is axially provided with a transparent cylinder 18 of plexiglas or of other material, ending atop externally to the vertix of the same cap with a sharp-pointed conical end 19 constituting the collimation point for the altimetic measurements, and which is protected by a threaded protection cap 20, which should be removed during measurements only.

The transparent cylinder 18 is moreover provided in its lower part with a surface having the shape of a spherical cap 21, acting as a convergent lens to focus the light coming from the lamp 10 through the bore 4, onto the vertix of the conical end 19, which gets hence illuminated like a star.

Finally, the outer conical end of said conical cap 16 is provided coloured by triangular sectors 22 or 23 alternatively white and black or of other highly contrasting colours, whilst the roof 24 of said protective cap 20 is coloured in luminescent orange or yellow, or in other showy colour.

I claim:

1. An industrial surveyor's signal for measuring planimetric and altimetric coordinates by collimating a signal from a plurality of goniometric positions, comprising:

a transparent cylindrical body having an upper and a lower end;

a cylindrical base secured to the lower end of said body;

a vertical cylindrical axial bore formed within said body for identifying a collimation point for the determination of said planimetric coordinates;

an inverted conical bore formed in said body to extend upwardly from said lower end and to terminate at its vertix in said vertical cylindrical bore;

a conical bore coaxial with said inverted conical bore and formed in said body to extend downwardly from said upper end and to terminate at its vertix in said vertical cylindrical bore;

a conical cap secured to the upper end of said body said cap having an upper surface and a lower surface;

a vertical cylindrical rod axially positioned within said cap having a spherical lower end extending downwardly through said lower surface and a sharp conical upper end extending upwardly through said upper surface, said conical upper end identifying a collimation point for the determination of said altimetric coordinates; and illuminating means within said body for directing light upwardly through said vertical cylindrical axial bore and said vertical cylindrical rod so as to provide a luminous mark at the collimation points for the determination of said planimetric and altimetric coordinates.

2. The signal according to claim 1, wherein said illuminating means comprises a lamp positioned within a parabolic reflector affixed to said cylindrical base so as to direct light upwardly through said inverted conical bore, said lamp being energized by a battery housed within said cylindrical base.

3. The signal according to claim 1, wherein the interior surfaces of said conical bore and said inverted conical bore are coated with an orange paint, so as to be luminescent under natural lighting conditions and transparent in the dark.

4. The signal according to claim 1, wherein the vertical breadth of said conical bore is unequal to the vertical breadth of said inverted conical bore.

5. The signal according to claim 1, wherein said transparent cylindrical body comprises methylmethacrylate resin.

6. The signal according to claim 1, wherein said vertical cylindrical rod comprises methylmethacrylate resin.

7. The signal according to claim 1, wherein said cylindrical base comprises a metal material.

8. The signal according to claim 1, wherein said conical cap comprises a metal material.

9. The signal according to claim 1, further comprising a removable cap for protecting the sharp conical upper end of said vertical cylindrical rod, said cap having a luminescent colored roof.

10. The signal according to claim 1, wherein said conical cap has alternating triangular sectors of highly contrasting colors.

11. The signal according to claim 1, wherein said conical cap has alternating black and white triangular sectors.

* * * * *